UNITED STATES PATENT OFFICE.

WILLARD A. DEANE, OF WESTPORT, CONNECTICUT, ASSIGNOR TO THE DORR COMPANY, A CORPORATION OF DELAWARE.

TREATMENT OF COLLOID-CONTAINING MEDIUMS.

1,359,037.   Specification of Letters Patent.   Patented Nov. 16, 1920.

No Drawing.   Application filed January 13, 1920. Serial No. 351,200.

*To all whom it may concern:*

Be it known that I, WILLARD A. DEANE, a citizen of the United States, residing at Westport, in the county of Fairfield, State of Connecticut, have invented certain new and useful Improvements in the Treatment of Colloid-Containing Mediums; and I do hereby declare the following to be a full, clear, and exact description of the invention, such as will enable others skilled in the art to which it appertains to make and use the same.

This invention relates to the treatment of pulps, liquors and the like, containing colloidal matter, and more particularly relates to the removal of colloidal matter from mediums containing the same.

Throughout this specification and the appended claims, I intend to embrace in the terms "colloid" and "colloidal matter" all substances which have the qualities of or resemble true colloids. Thus, for the purposes of the present invention, the colloidal matter may be considered as ranging in size upward through the class of the so-called suspensoids. By colloidal matter, therefore, I mean material which, while not necessarily truly colloidal, exhibits colloidal characteristics, such, for example, as the property of existing in both the sol or gel state, or of being dispersed and coagulated or flocculated and deflocculated.

In many chemical and allied industries mediums, such as pulps, liquors, and the like, containing colloidal matter are encountered. Frequently, the presence of such colloidal matter is objectionable and its removal from the medium for one reason or another is desirable and often necessary. For example, the colloidal matter may constitute an impurity or a foreign substance in the medium, and the removal of this impurity or foreign matter may be desirable. Again, the presence of the colloidal matter may interfere with or prejudice some subsequent treatment to which the medium is to be subjected and the removal of the colloidal matter then becomes desirable in order to overcome its prejudicial effect in such subsequent treatment of the medium.

There are two general procedures by which colloidal matter may be removed from a medium containing the same, namely, by sedimentation and by decantation. As an example of the removal of colloids by sedimentation, we may take the case of a liquor or solution containing colloidal matter. By coagulating or flocculating the colloidal matter and permitting the flocculated material to settle, there is obtained a sludge containing the flocculated colloids and a supernatant liquor which can be decanted and thereby freed from its original colloid content. As an example of the removal of colloids by decantation, we may take the case of a pulp containing, in addition to the colloidal matter, solid or insoluble particles. In this case, the colloidal matter is dispersed or deflocculated by suitable agents or instrumentalities and upon settling the supernatant liquor containing the dispersed colloids is removed from the settled solids which latter, being now substantially freed of colloidal matter, may be subjected to such subsequent treatment as desired.

The present invention contemplates the removal of colloidal matter from a medium containing the same by treating the medium with packing house stick to convert the colloidal matter into a physical state in which it is readily removable from the medium. Packing house stick may be used as either a flocculating or dispersing agent depending upon the nature of the medium and the characteristics of the colloids contained therein. In the case of any particular medium containing colloidal matter, simple tests will show whether packing house stick acts as a flocculating agent or as a dispersing agent of the colloids. When employed as a coagulating or flocculating agent, the packing house stick causes the colloidal matter in the medium to coagulate or flocculate, whereupon the coagulated or flocculated colloidal matter is permitted to settle leaving the supernatant liquor substantially free of colloidal matter. When employed as a dispersing or deflocculating agent, the packing house stick causes the colloidal matter in the medium to disperse or deflocculate so that the dispersed colloidal matter has a slower rate of settling than other solid particles in the medium, whereby after appropriate sedimentation the supernatant liquid containing the dispersed colloids can be removed leaving behind the settled solids substantially free of colloidal matter. The packing house stick will thus generally be used as a coagulating agent of colloidal matter in those mediums in which it is practicable to remove the colloidal matter as a sludge, whereas the packing house stick will be used as a dispersing agent of colloidal matter in those mediums in which it is practicable to remove the colloidal matter with a supernatant liquid.

Packing house stick is a by-product of the packing house industry and is a gel of organic composition. Generally speaking, it is the liquor resulting from the boiling with water of the refuse matter, such, for example, as waste meat products, of the packing house industry. As originally obtained, the packing house stick is a thin watery liquid with a slight yellowish cast. In this form, it is generally called "stick liquor." This stick liquor is usually concentrated by evaporation to the consistency of thick molasses. For the purposes of the present invention, the packing house stick can be used in its original dilute form or concentrated to any desired consistency, and throughout this specification and the appended claims, I intend to cover by the expression "packing house stick" any and all forms of this particular material. For use as a coagulating or dispersing agent of colloidal matter, I have found that it is important that the packing house stick be a pure product from the point of view in which the product is recognized in the packing house industry. In other words, the stick should not be admixed with other packing house products, such, for example, as glue, or the like.

As an example of the use of packing house stick as a coagulating or flocculating agent of colloidal matter, I will describe the process of removing colloidal matter by this agent from a pulp containing in solution a salt of aluminum such, for example, as aluminum sulfate. In the process of manufacturing aluminum sulfate, or other salt of aluminum, from aluminum-bearing ores, such as bauxite, the ore is first ground to an appropriate size and is then fed into the first of a series of reaction tanks in which the ore is treated with a suitable solvent for the aluminum content thereof, for example, commercial sulfuric acid of a strength of about 50° Be'., or other appropriate mineral acid in the case of other salts of aluminum. The sulfuric acid dissolves the aluminum and iron in the ore, with the production, at this stage of the process, of a pulpy mass containing, in addition to the dissolved aluminum and iron, suspended and colloidal matter such as clay, sand, silica, etc. In accordance with the present invention, packing house stick is added to this pulpy mass in order to effect coagulation or flocculation of the colloidal matter therein.

The reaction tanks may be interconnected so that the mixture of ore and acid can be treated either intermittently or passed continuously from one to the next in the series. The packing house stick may advantageously be added to the last reaction tank in the series. In this reaction tank, an intimate mixture of the stick with the pulp is effected and the stick serves to bring about coagulation or flocculation of the colloidal matter. The separation of the coagulated or flocculated colloids from the liquor can be effected in various ways. In the example under consideration, the product to be saved is the liquor containing the aluminum and iron salts in solution. The removal of the coagulated or flocculated colloids from this liquor can be advantageously accomplished by sedimentation, in the course of which the coagulated colloids, together with such other solid material as is contained in the pulpy mass, settle out leaving a supernatant liquor containing in solution the aluminum and iron salts. I have found it advantageous to remove the coagulated colloids and other solid matter from the pulpy mass by countercurrent decantation. To this end, I prefer to use thickeners of the well-known Dorr type, arranged on the countercurrent decantation principle. As the result of this treatment, a substantially clear liquor containing aluminum and iron salts in solution is decanted from the first thickener in the series and a sludge containing the coagulated colloidal matter together with other solid material is withdrawn from the last thickener in the series.

The clear liquor containing aluminum sulfate (or other salt of aluminum) and the iron salt or salts may be conducted to suitable evaporators and subjected to appropriate treatment to prepare it for the various uses for which it is adapted. For certain uses, the presence of ferric iron, in combination with aluminum sulfate, is objectionable, and in such cases reduction of the ferric iron to the ferrous state can be effected at any appropriate stage in the process, as will be well understood by those skilled in the art.

I have found that packing house stick may advantageously be used as a dispersing agent of colloidal matter in processes of concentrating ores by flotation. In such processes, the ore pulp frequently contains colloidal matter which interferes with or prejudices the recovery by flotation methods of the metallic values in the pulp. In such cases, the flotation treatment is improved by the removal of the colloidal matter from the ore pulp prior to the flotation operation. Thus, in accordance with my present invention, an ore pulp containing colloidal matter may be treated with packing house stick. I have found that packing house stick in an ore pulp will disperse or deflocculate colloidal matter, and these dispersed or deflocculated colloids may then be removed from the ore pulp by decantation. Thus, the ore pulp is intimately mixed with an appropriate amount of packing house stick, and after thorough admixture the pulp is allowed to settle, whereupon the mineral and gangue particles will settle out leaving a supernatant liquor containing the dispersed or deflocculated colloidal matter. This supernatant liquor is then withdrawn leaving behind a thickened ore pulp substantially free of colloidal matter. This thickened ore pulp may then be diluted with an appropriate amount of colloid-free water and subjected to flotation treatment in the presence of an appropriate flotation agent for the recovery of the metal values contained therein.

From the foregoing description, it will be seen that packing house stick may be used for the removal of colloidal matter from a medium containing the same by either coagulating the colloidal matter or by dispersing the colloidal matter. The action of the packing house stick as either a coagulating agent or a dispersing agent will depend upon the nature and properties of the medium, as well as upon the characteristics of the colloidal matter contained therein. The action of the packing house stick in the case of any particular medium can be determined by simple tests well understood by those familiar with the principles of colloid chemistry. In any case, it will be seen that the invention provides an effective and efficient method of removing colloidal matter to the desired extent from a medium containing the same.

I claim:

1. The method of removing colloidal matter from a medium containing the same which comprises treating the medium with packing house stick to convert the colloidal matter into a physical state in which the colloidal matter can be readily separated from the medium, and then removing the colloidal matter to the desired extent from the medium; substantially as described.

2. The method of flocculating and removing colloidal matter from a medium containing the same which comprises treating the medium with packing house stick to flocculate the colloidal matter, and removing the flocculated colloidal matter from the medium; substantially as described.

3. The method of flocculating and removing colloidal matter from a medium containing the same which comprises treating the medium with packing house stick to flocculate the colloidal matter, and separating the flocculated colloidal matter from the medium by countercurrent decantation; substantially as described.

4. The method of removing foreign matter from a medium containing the same together with a salt of aluminum in solution which comprises treating the medium with packing house stick, and subsequently removing the foreign matter from the medium with the production of a substantially clear liquid containing the salt of aluminum in solution; substantially as described.

5. The method of removing colloidal and other foreign matter from a medium containing the same and a salt of aluminum in solution which comprises treating the medium with packing house stick and thereby flocculating the colloidal matter, and removing the flocculated colloidal and foreign matter from the medium by sedimentation with the production of a substantially clear liquid containing the salt of aluminum in solution; substantially as described.

6. The method of treating aluminum bearing ores which comprises subjecting the ore to the action of a mineral acid to dissolve the soluble constituents of the ore, treating the resulting pulpy mass with packing house stick to coagulate foreign matter present in the mass, and subsequently separating the coagulated foreign matter from the mass with the production of a liquid containing in solution a salt of aluminum; substantially as described.

In testimony whereof I affix my signature.

WILLARD A. DEANE.